US010098057B2

(12) United States Patent
Yun et al.

(10) Patent No.: US 10,098,057 B2
(45) Date of Patent: Oct. 9, 2018

(54) METHOD AND APPARATUS FOR WI-FI DEVICE TYPE IDENTIFICATION AND DEVICE TYPE BASED DIAGNOSTICS AND OPTIMIZATION

(71) Applicant: ADAPTIVE SPECTRUM AND ALIGNMENT INC., Redwood City, CA (US)

(72) Inventors: Sungho Yun, San Jose, CA (US); Carlos Garcia, Mountain View, CA (US); Javier Monteagudo, Madrid (ES); Manikanden Balakrishnan, San Mateo, CA (US); Wooyul Lee, Palo Alto, CA (US)

( * ) Notice: Subject to any disclaimer, the term of this patent is extended or adjusted under 35 U.S.C. 154(b) by 5 days.

(21) Appl. No.: 15/323,087

(22) PCT Filed: Jun. 30, 2014

(86) PCT No.: PCT/US2014/044912
§ 371 (c)(1),
(2) Date: Dec. 29, 2016

(87) PCT Pub. No.: WO2016/003423
PCT Pub. Date: Jan. 7, 2016

(65) Prior Publication Data
US 2017/0142644 A1    May 18, 2017

(51) Int. Cl.
*H04W 48/16*  (2009.01)
*H04L 29/08*  (2006.01)
(Continued)

(52) U.S. Cl.
CPC .......... *H04W 48/16* (2013.01); *H04L 67/303* (2013.01); *H04W 24/02* (2013.01); *H04W 24/04* (2013.01); *H04W 84/12* (2013.01)

(58) Field of Classification Search
CPC ....... H04W 76/023; H04W 4/80; H04W 4/06; H04W 76/02; H04W 76/00; H04W 84/18;
(Continued)

(56) References Cited

U.S. PATENT DOCUMENTS 9,182,757 B2 * 11/2015 Holmes .............. G05B 19/4185
2012/0120879 A1   5/2012 Ozawa
(Continued)

FOREIGN PATENT DOCUMENTS

EP       2658339       10/2013
WO       2007102040     9/2007

OTHER PUBLICATIONS

International Search Report & Written Opinion, dated Nov. 17, 2014, for PCT Patent Application No. PCT/US2014/044912.
(Continued)

*Primary Examiner* — Jung Liu
(74) *Attorney, Agent, or Firm* — North Weber & Baugh LLP

(57) ABSTRACT

A software application executing on a server and communicating with an agent in a wireless access point predicts a type of a computing device wirelessly connected via a radio frequency link to the wireless access point. The application receives an indication of a model of the computing device from the wireless access point, and further receives one or more characteristics of the computing device from the wireless access point. The application then predicts the type of the computing device associated with the one or more of the indication of the model, and characteristics, of the computing device.

25 Claims, 2 Drawing Sheets

(51) Int. Cl.
  *H04W 24/02* (2009.01)
  *H04W 24/04* (2009.01)
  *H04W 84/12* (2009.01)

(58) Field of Classification Search
  CPC ....... H04W 4/008; H04W 4/00; H04W 84/00; G01S 5/0018; G02B 2027/014; G02B 27/017; G02B 2027/0178; G02B 27/0101; G02B 27/01; G02B 27/00; G02B 27/0093; G06F 3/002; G06F 3/005; G06F 3/013; G06F 3/011
  See application file for complete search history.

(56) References Cited

U.S. PATENT DOCUMENTS

| | | | | |
|---|---|---|---|---|
| 2013/0114491 | A1* | 5/2013 | Kim | H04W 74/06 370/312 |
| 2013/0294427 | A1* | 11/2013 | Kim | H04W 16/14 370/338 |
| 2014/0068030 | A1* | 3/2014 | Chambers | H04L 41/0809 709/220 |
| 2014/0094159 | A1* | 4/2014 | Raleigh | H04W 24/02 455/418 |
| 2014/0247728 | A1* | 9/2014 | Amitai | H04L 43/065 370/252 |
| 2015/0134860 | A1* | 5/2015 | Lee | H04N 21/436 710/9 |

OTHER PUBLICATIONS

Response dated Nov. 9, 2017, in European Patent Application No. 14747749.1 (7pgs).
International Preliminary Report on Patentability, dated Jan. 12, 2017, for PCT Patent Application No. PCT/US2014/044912.

* cited by examiner

METHOD AND APPARATUS FOR WI-FI DEVICE TYPE IDENTIFICATION AND DEVICE TYPE BASED DIAGNOSTICS AND OPTIMIZATION

CLAIM OF PRIORITY

This Application is a National Stage Entry of, and claims priority to, PCT Application No. PCT/US14/44912, filed on 24 Nov. 2014 and titled "METHOD AND APPARATUS FOR WI-FI DEVICE TYPE IDENTIFICATION AND DEVICE TYPE BASED DIAGNOSTICS AND OPTIMIZATION," which is incorporated by reference in its entirety for all purposes.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments of the present invention relates to optimization of wireless-communication-capable computing devices.

BACKGROUND

Wireless computing devices, such as Wi-Fi-enabled, or Wi-Fi compliant, computing devices, have many different purposes, capabilities and characteristics. Knowing such would help in diagnosing and optimizing the performance of such devices, since optimizing or diagnosing various different devices having different purposes, capabilities or characteristics, under the same policy, may result in sub-optimal performance or less accurate detection and diagnosis of wireless communications or other device-related operations and issues depending on the devices in use. However, getting accurate device-specific information from a Wireless Access Point (WAP), or simply, Access Point (AP), without user or administrative intervention, may be difficult.

BRIEF DESCRIPTION OF THE DRAWINGS

Embodiments are illustrated by way of example, and not by way of limitation, and can be more fully understood with reference to the following detailed description when considered in connection with the figures in which.

DETAILED DESCRIPTION

Embodiments of the invention relate to methods and corresponding apparatus to identify a type of the wireless computing device, such as a type of Wi-Fi enabled computing device, to classify the device according to, for example, its purpose, its capabilities and/or its characteristics, and to diagnose and optimize different types of wireless computing devices according to different policies.

Figure 1:
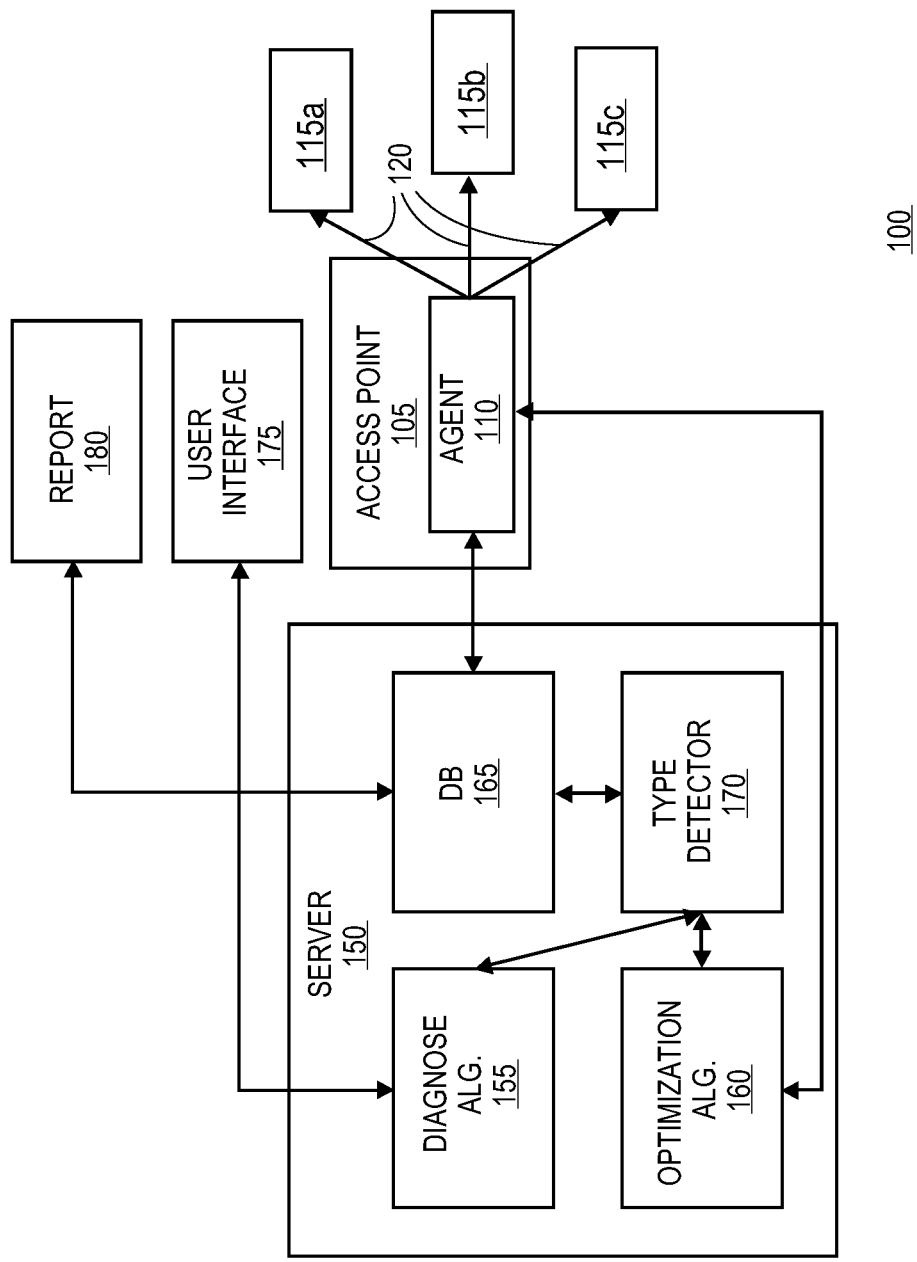
FIG. 1 illustrates a block diagram within which an embodiment of the invention operates.
Figure 2:
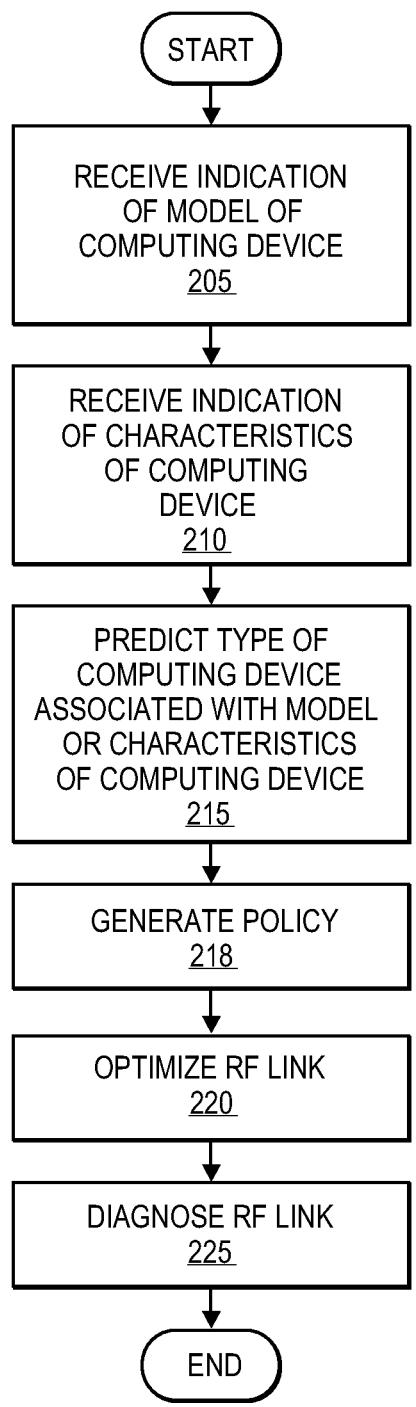
FIG. 2 illustrates a flow diagram of an embodiment of the invention.

An embodiment of the invention is described with reference to the block diagram in FIG. 1 and the flowchart in FIG. 2. Although the blocks in the flowcharts with reference to FIG. 2 are shown in a particular order, the order of the actions can be modified. Thus, the illustrated embodiments can be performed in a different order, and some actions/blocks may be performed in parallel. Some of the blocks and/or operations listed in FIG. 2 are optional in accordance with certain embodiments. The numbering of the blocks presented is for the sake of clarity and is not intended to prescribe an order of operations in which the various blocks must occur. Additionally, operations from the various flows may be utilized in a variety of combinations. In one embodiment 100, a software application executing on a server 150 and communicating with an agent 110 in a wireless access point 105 predicts a type of a computing device that is wirelessly connected via a radio frequency link 120 to the wireless access point. For example, station type detector module 170 communicates with permanent store 165 to identify a type of computing device that communicates with access point 105. In FIG. 1, wireless computing devices 115a, 115b and 115c communicate wirelessly with access point 105, for example, according to the Wi-Fi protocol standard. Each of these devices may be different types of devices, having different hardware, software, memory, or firmware, capabilities or characteristics, having different versions of hardware, software, memory, or firmware, or having different types of traffic or usage pattern.

According to one embodiment, the first step 205 in the process of predicting the type of computing device that communicates with access point 105 via radio frequency link 120 is receiving an indication at the server of a model of a computing device 115 (e.g., any one of 115a, 115b or 115c) from the wireless access point 105, or from agent 110 since the agent is collecting and sending information to the server. Moreover, agent 110 can actively collect information, for example, by sending requests to the stations, such as mDNS, SSDP requests, to get additional station name information. The model of a computing device is a name and/or number or other indicia that specifically identifies the computing device, for example, an Apple iPhone 5S. An indication of a model of the computing device might be a name assigned to the computing device, for example, "My iPhone" or "Jane's iPad". The next step 210 involves receiving one or more characteristics of the computing device 115 from the wireless access point 105, or from agent 110. In alternative embodiments, the first and second steps may happen in reverse order, or only one of the steps may occur.

After either one or both of steps 205 and 210, one embodiment predicts at 215, with the help of type detector module 170, the type of the computing device 115 associated with one or more of the indication of a model, and characteristics, of the computing device. (A type of the computing device is a broader than a model of the computing device. For example, a type of computing device might be a mobile device, or even a mobile cellular telephone computing device, whereas there maybe various models of a given type, such as there are many different models of mobile cellular telephones.) In another embodiment, a type detector module 170 predicts at step 215a model of the computing device 115 associated with one or more of the indication of the model, and characteristics, of the computing device. In yet another embodiment, type detector module 170 predicts at step 215 a type for, and a model of, the computing device 115 associated with one or more of the indication of the model, and characteristics, of the computing device. In one embodiment, before any predictions can occur, a detection algorithm goes through a training phase, where indication of a model and computing device characteristics are associated with computing device types. The indication of a model and characteristics information is gathered and stored in a permanent store 165 during the training phase, and a classification algorithm maps or associates such to one or more computing device types. Alternatively, or additionally, during the training phase, similar data regarding a particular computing device type may be input, either by an administrator or an end user, and stored in data store 165.

Once the training phase is done, the server 150 receives the data (indication of a model, characteristics, etc.) as described above, and uses the detection algorithm in type detector module 170 to predict (or classify) a type of computing device associated with such. As an example, consider a computing device with the following characteristics: media access control (MAC) address=MAC1, operating system=Apple iOS 6.0, maximum observed Wi-Fi throughput=110 Mbps, Wi-Fi bands: 2.4 GHz/5GHz, and mobility=high. It may be that data store 165 does not have an exact entry corresponding to this computing device, for example, because the MAC address is, of course, unique and not present in database 165. However, the detection algorithm will find an entry in data store 165 that has the most and/or closest characteristics corresponding to the computing device, and predict that the computing device is a particular type of computing device, for example, an Apple iPhone 5 mobile cellular telephone.

In one embodiment, receiving at 205 the indication of the model of the computing device from the wireless access point involves receiving an address for the computing device and/or a name for the computing device. In one such embodiment, predicting the type of the computing device comprises searching permanent data store 165 for a range of one or more addresses that includes the address for the computing device, in particular, a range of one or more addresses associated with a type of the computing device. In one embodiment, the address is a MAC-layer address. It is contemplated, of course, that other addresses may also be used, for example, a physical layer address, a different data link layer address than a MAC-layer address, a network layer address, a transport layer address, and an application layer address, all as defined in an Open Systems Interconnection (OSI)-model for computer networking, or as defined in the Internet protocol suite.

In one embodiment, predicting the type of the computing device comprises searching a permanent data store accessible to the server for a model name that best matches the name for the computing device, the model name being associated with a type of the computing device. In one embodiment, the name for the computing device is selected from one or more of a group of names consisting of: a network-layer name, a session-layer name, an application-layer name, and a login name, as defined in an Open Systems Interconnection (OSI)-model for computer networking, or as defined in the Internet protocol suite. As examples of such, embodiments may use a Dynamic Host Configuration Protocol (DHCP) name, NetBIOS name, a multicast Domain Name System (mDNS) name, or a Simple Service Discovery Protocol (SSDP) name.

According to one embodiment, receiving at 210 the one or more characteristics of the computing device from the wireless access point involves receiving, for example, an indication of mobility (e.g., such as rapid changes in signal strength) for the computing device, a traffic type associated with a predominant data traffic flow between the computing device and the wireless access point via the radio frequency link 120, an indication of a response by the computing device to a change in environmental characteristics (.e.g., interference volume and power, or noise level) for the radio frequency link between the computing device and the wireless access point, data transmission metrics associated with a data traffic flow between the computing device and the wireless access point, whether the computing device is predominantly a source or destination of the data traffic flow between the computing device and the wireless access point, content of data traffic packets from data traffic flow between the computing device and the wireless access point, source and/or destination address of data packets from data traffic packets from data traffic flow between the computing device and the wireless access point, wireless communication capability of the computing device (e.g., Wi-Fi standards: 802.11b, g, n, ac; supported data rates, number of antennas, maximum observed data throughput, observed data rates, communication bandwidths), and hardware and software characteristics of the computing device (.e.g., operating system version of computing device, Wi-Fi chipset vendor and/or version number). In one embodiment, receiving the one or more indications of characteristics of the computing device from the wireless access point comprises polling the wireless access point for such or one or more environmental characteristics of the radio frequency link between the wireless access point and the computing device.

Continuing with FIGS. 1 and 2, one embodiment of the invention further contemplates an optimization module 160 providing output at 220 to optimize the radio frequency link between the wireless access point and the computing device according to a policy associated with the type of computing device received responsive to the prediction. It is contemplated, in one embodiment, that if the prediction is not successful, the optimization module may still continue to optimize by considering a generic station type. The purpose of doing so may be, for example, to improve the performance (throughput, latency and connectivity) between the wireless access point and the computing device. The purpose of using the station type is to optimize more relevant quantities and stations. For example, it is not necessary to maximize throughputs for printers, or sensors, but it is arguably more important to optimize throughputs for an IPTV device.

Another embodiment further contemplates a diagnostics module 155 providing output at 225 to diagnose the radio frequency link between the wireless access point and the computing device according to a policy associated with the type of computing device received responsive to the prediction. Yet another embodiment contemplates diagnostics module 155 providing output at 225 to diagnose the radio frequency link between the wireless access point and the computing device according to a policy associated with the received one or more characteristics of the computing device. One embodiment may also diagnose the radio frequency link between the wireless access point and the computing device according to a policy associated with both the type of computing device received responsive to the prediction and the received one or more characteristics of the computing device.

In the above described embodiments, the basic components of 1) receiving an indication of a model of the computing device from the wireless access point; 2) receiving one or more characteristics of the computing device from the wireless access point; 3) predicting the type of the computing device associated with one or more of the indication of the model, and characteristics, of the computing device; 4) and classifying the computing device into a type with the model prediction and characteristics of the computing device is described. FIGS. 1 and 2 are similarly limited to a single server, access point, and a small number of wireless computing devices, for purposes of ease of explanation. However, it appreciated that embodiments of the present invention contemplate many computing devices, separate co-located groups of which communicate with one of a number of wireless access points via a radio frequency link. The software application executing on the server is communicating with a respective one of a corresponding number of agents residing in the wireless access points. Thus, it is contemplated server 150 receives indications of models for many computing devices communicating with many wireless access points, and receives characteristics for many computing devices communicating from the many wireless access points. The server stores the received indications and characteristics as historical information in the permanent store 165 accessible to the server. The server, in predicting the type and classifying into a type of the computing device associated with one or more of the indications of the model, and characteristics, of the computing device, accesses the historical information in the permanent data store for a type of the computing device associated with one or more of the indications of the model, and characteristics, of the computing device.

According to one embodiment, the process further includes generating at 218 a policy associated with a computing device for optimizing and/or diagnosing the radio frequency link between a wireless access point and the computing device based on the historical information and the type of the computing device. In one embodiment, the policy associated with a computing device, once generated, may be transmitted to the agent in the wireless access point with which the computing device is wirelessly connected to effect the optimization of the radio frequency link between the wireless access point and the computing device. The next step, according to one embodiment, is executing the policy associated with the computing device for diagnosing the radio frequency link between the wireless access point and the computing device and providing a result of executing the policy to a user interface.

Thus, described herein is a method for a software application executing on a server and communicating with an agent in a wireless access point to predict a type of a computing device wirelessly connected via a radio frequency link to the wireless access point, comprising receiving an indication of a model of the computing device from the wireless access point; receiving one or more characteristics of the computing device from the wireless access point; and predicting the type of the computing device associated with one or more of the indication of a model, and characteristics, of the computing device. One embodiment further comprises predicting a model of the computing device associated with one or more of the indication of a model, and characteristics, of the computing device.

In one embodiment, receiving the indication of a model of the computing device from the wireless access point comprises receiving at least one of an address for the computing device and a name for the computing device.

In one embodiment, predicting the type of the computing device comprises searching a permanent data store accessible to the server for a range of one or more addresses that includes the address for the computing device, the range of one or more addresses associated with a type of the computing device. In such an embodiment, the address for the computing device is selected from one or more of a group of addresses consisting of: a physical layer address, a data link layer address, a network layer address, a transport layer address, and an application layer address, as defined in an Open Systems Interconnection (OSI)-model for computer networking, or as defined in the Internet protocol suite.

In one embodiment, predicting the type of the computing device comprises searching a permanent data store accessible to the server for a model name that matches the name for the computing device, the model name associated with a type of the computing device. In such an embodiment, the name for the computing device is selected from one or more of a group of names consisting of: a network-layer name, a session-layer name, an application-layer name, and a login name, as defined in an Open Systems Interconnection (OSI)-model for computer networking, or as defined in the Internet protocol suite.

In one embodiment, receiving one or more characteristics of the computing device from the wireless access point comprises receiving one or more of: an indication of mobility for the computing device, a traffic type associated with a predominant data traffic flow between the computing device and the wireless access point via the radio frequency link, an indication of a response by the computing device to a change in transmit power settings on the wireless access point, environmental characteristics for the radio frequency link between the computing device and the wireless access point, data transmission metrics associated with a data traffic flow between the computing device and the wireless access point, whether the computing device is predominantly a source or destination of the data traffic flow between the computing device and the wireless access point, content of data traffic packets from data traffic flow between the computing device and the wireless access point, source and/or destination address of data packets from data traffic packets from data traffic flow between the computing device and the wireless access point, wireless communication capability of the computing device, and hardware and software characteristics of the computing device. In such an embodiment, receiving one or more characteristics of the computing device from the wireless access point comprises polling the wireless access point for such or one or more environmental characteristics of the radio frequency link between the wireless access point and the computing device.

One embodiment further comprises optimizing the radio frequency link between the wireless access point and the computing device according to a policy associated with the type of computing device received responsive to the prediction. Another embodiment further comprises optimizing the radio frequency link between the wireless access point and the computing device according to a policy associated with the received one or more characteristics of the computing device. Yet another embodiment further comprises diagnosing the radio frequency link between the wireless access point and the computing device according to a policy associated with the type of computing device received responsive to the prediction. Finally, another embodiment further comprises diagnosing the radio frequency link between the wireless access point and the computing device according to a policy associated with the received one or more characteristics of the computing device.

In one embodiment, the wireless access point is one of a plurality of wireless access points with which the software application executing on the server is communicating with a respective one of a corresponding plurality of agents, and wherein the computing device is one of a plurality of computing devices each wirelessly connected via a radio frequency link to one of the plurality of wireless access points, the method further comprising: receiving indications of models of the plurality of computing devices from the plurality of wireless access points; receiving characteristics of the plurality of computing device from the plurality of wireless access points; and storing the received indications and characteristics as historical information in a permanent store accessible to the server, and wherein predicting the type of the computing device associated with one or more of the indication of a model, and characteristics, of the computing device comprises accessing the historical information in the permanent data store for a type of the computing device associated with one or more of the indication of a model, and characteristics, of the computing device. Such an embodiment may further comprise generating a policy associated with a computing device for optimizing and/or diagnosing the radio frequency link between a wireless access point and the computing device based on one or more of the historical information, the type of the computing device, and the characteristics of the computing device. Such an embodiment may further comprise transmitting the policy associated with a computing device to the agent in the wireless access point with which the computing device is wirelessly connected to effect the optimization of the radio frequency link between the wireless access point and the computing device. One embodiment further comprise executing the policy associated with the computing device for diagnosing the radio frequency link between the wireless access point and the computing device and providing a result of executing the policy to a user interface.

It is noted that the various above-described embodiments may be implemented in a computer-readable, non-transitory, storage medium, comprising computer instructions, that when executed, causes a server communicating with an agent in a wireless access point to operate according to the various embodiments.

According to the above-described embodiments, a series of examples follow.

Example 1

Wireless computing devices running the Transmission Control Protocol/Internet protocol (TCP/IP) protocol suite are assigned Internet host names, which are resolved into an IP address by a Domain Name Service (DNS) server. Often times, the default names include terms that can be used to identify the type of the devices (e.g., a model name.) In addition to the Internet host name, there are more network related names that can be extracted to identify the type of the device. Extracted network names may be matched to the names that are associated with, or paired with, known device types and used to identify the type of the devices.

Example 2

Network interfaces for communication are assigned unique identifiers called media access control (MAC) addresses. The first three octets identify the organization that issued the identifier and are known as the Organizationally Unique Identifier (OUI). Although each organization can assign the last three octets to their products in any way they want, it is common that the same type of devices get MAC addresses belonging to a selected range of MAC addresses as defined by the last three octets. Using the known pairs of MAC addresses and device types, embodiments of the invention may classify a newly detected device using its MAC address. As more device type information is collected, the classification becomes more accurate.

Example 3

Wi-Fi enabled devices have different capabilities (e.g., maximum constellation size, maximum number of simultaneous transmit-streams, maximum bandwidth, etc.) which result in different performance characteristics. This kind of information is helpful, and may even be essential, when diagnosing Wi-Fi enabled devices since such capabilities informs the thresholds used to detect and/or diagnose performance issues. For example, less capable legacy (i.e., older) Wi-Fi devices may show low throughput even with clean data transmission channel conditions. In such case, rather than declare the low throughput as a Wi-Fi issue, a recommendation is made to replace the device with a more capable Wi-Fi device, for example, by way of a generated report 180. In one embodiment, certain Wi-Fi device capability information may be polled from an access point while the other such information may be obtained by examining the Wi-Fi traffic between the access point and Wi-Fi devices.

Example 4

While some Wi-Fi devices are for generic use, some are optimized for specific uses only. For example Wi-Fi Voice Over IP (VoIP) phones are for voice traffic only, Wi-Fi IPTV set-top boxes are for mostly video traffic only, and Wi-Fi home automation devices are for delivering sensing and control information only. In such cases, there is a need to consider the traffic pattern and requirement of the different applications when diagnosing or optimizing the performance of those devices. For VoIP devices, as an example, latency is important to the quality of service, yet throughput is of less concern. For home automation devices, a key metric is how to ensure the delivery of information, but speed of delivery is not very important. For video traffic, both latency and throughput are important. One can use the device type information obtained by the abovementioned embodiments and/or examine the historical pattern and type of packets of Wi-Fi traffic to determine the dominant application of the device and optimize accordingly.

Example 5

Wi-Fi devices have different characteristics relating to environmental conditions. Some devices have better components and manage to retain performance under less optimal conditions while the other such devices may be vulnerable to degeneration of the condition of the Wi-Fi channel. Therefore, it is advantageous to impose different policies to devices with different characteristics. For example, if a Wi-Fi device can maintain its performance under degenerated Wi-Fi channel conditions while other Wi-Fi devices cannot, recommendations for action should not be generated for this device, and optimizations should not occur. Differentiation between Wi-Fi devices in this way depends on accurate analysis of the historical performance of Wi-Fi devices and classification.

CONCLUSION

Some portions of this detailed description are presented in terms of algorithms and symbolic representations of operations on data within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from this discussion, it is appreciated that throughout the description, discussions utilizing terms such as "processing" or "generating" or "determining" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of present invention also relate to apparatuses for performing the operations herein. Some apparatuses may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, DVD-ROMs, and magnetic-optical disks, read-only memories (ROMs), random access memories (RAMs), EPROMs, EEPROMs, NVRAMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems appears from the description herein. In addition, embodiments of the present invention are not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

What is claimed is:

1. A method for applying access control policies, the method comprising:
   receiving an indication of a model of a computing device from a wireless access point;
   receiving one or more characteristics of the computing device from the wireless access point;
   examining a pattern and a type of traffic between the computing device and the wireless access point to determine a performance of the computing device; and
   based on at least one metric associated with the performance, predicting the type of the computing device associated with one or more of the indication of a model, and characteristics, of the computing device.

2. The method of claim 1, further comprising predicting a model of the computing device associated with one or more of the indication of a model, or characteristics, of the computing device.

3. The method of claim 1, wherein receiving the indication of a model of the computing device from the wireless access point comprises receiving at least one of an address for the computing device or a name for the computing device.

4. The method of claim 3, wherein predicting the type of the computing device comprises searching a permanent data store accessible to the server for a range of one or more addresses that includes the address for the computing device, wherein the range of one or more addresses is associated with a type of the computing device.

5. The method of claim 4, wherein the address for the computing device is selected from one or more of a group of addresses which includes one or more of: a physical layer address, a data link layer address, a network layer address, a transport layer address, and an application layer address, as defined in an Open Systems Interconnection (OSI)-model for computer networking, or as defined in the Internet protocol suite.

6. The method of claim 3, wherein predicting the type of the computing device comprises searching a permanent data store accessible to the server for a model name that matches the name for the computing device, wherein the model name is associated with a type of the computing device.

7. The method of claim 6, wherein the name for the computing device is selected from one or more of a group of names which includes one or more of: a network-layer name, a session-layer name, an application-layer name, and a login name, as defined in an Open Systems Interconnection (OSI)-model for computer networking, or as defined in the Internet protocol suite.

8. The method of claim 1, wherein receiving one or more characteristics of the computing device from the wireless access point comprises:
   receiving one or more of:
   an indication of mobility for the computing device,
   a traffic type associated with a predominant data traffic flow between the computing device and the wireless access point via the radio frequency link,
   an indication of a response by the computing device to a change in transmit power settings on the wireless access point,
   environmental characteristics for the radio frequency link between the computing device and the wireless access point,
   data transmission metrics associated with a data traffic flow between the computing device and the wireless access point, whether the computing device is predominantly a source or destination of the data traffic flow between the computing device and the wireless access point,
   content of data traffic packets from data traffic flow between the computing device and the wireless access point,
   source and/or destination address of data packets from data traffic packets from data traffic flow between the computing device and the wireless access point,
   wireless communication capability of the computing device, or hardware and software characteristics of the computing device.

9. The method of claim 8, wherein receiving one or more characteristics of the computing device from the wireless access point comprises polling the wireless access point for such or one or more environmental characteristics of the radio frequency link between the wireless access point and the computing device.

10. The method of claim 1, further comprising optimizing the radio frequency link between the wireless access point and the computing device according to a policy associated with the type of computing device received responsive to the prediction.

11. The method of claim 1, further comprising optimizing the radio frequency link between the wireless access point and the computing device according to a policy associated with the received one or more characteristics of the computing device.

12. The method of claim 1, further comprising diagnosing the radio frequency link between the wireless access point and the computing device according to a policy associated with the type of computing device received responsive to the prediction.

13. The method of claim 1, further comprising diagnosing the radio frequency link between the wireless access point and the computing device according to a policy associated with the received one or more characteristics of the computing device.

14. The method of claim 1, wherein the wireless access point is one of a plurality of wireless access points with which the software application executing on the server is communicating with a respective one of a corresponding plurality of agents, and wherein the computing device is one of a plurality of computing devices at least one of which is wirelessly connected via a radio frequency link to one of the plurality of wireless access points, the method further comprising:
receiving indications of models of the plurality of computing devices from the plurality of wireless access points;
receiving characteristics of the plurality of computing device from the plurality of wireless access points; and
storing the received indications and characteristics as historical information in a permanent store accessible to the server, and
wherein predicting the type of the computing device associated with one or more of the indication of a model, or characteristics, of the computing device comprises accessing the historical information in the permanent data store for a type of the computing device associated with one or more of the indication of a model, or characteristics, of the computing device.

15. The method of claim 14, further comprising generating a policy associated with a computing device for optimizing and/or diagnosing the radio frequency link between a wireless access point and the computing device based on one or more of: the historical information, the type of the computing device, or the characteristics of the computing device.

16. The method of claim 15, further comprising transmitting the policy associated with a computing device to the agent in the wireless access point with which the computing device is wirelessly connected to effect the optimization of the radio frequency link between the wireless access point and the computing device.

17. The method of claim 14, further comprising executing the policy associated with the computing device for diagnosing the radio frequency link between the wireless access point and the computing device and providing a result of executing the policy to a user interface.

18. A computer-readable, non-transitory, storage medium, comprising computer instructions, that when executed, causes a server communicating with an agent in a wireless access point to apply access control policies, the method comprising:
receiving an indication of a model of a computing device from a wireless access point;
receiving one or more characteristics of the computing device from the wireless access point;
examining a pattern and a type of traffic between the computing device and the wireless access point to determine a performance of the computing device; and
based on at least one metric associated with the performance, predicting the type of the computing device associated with one or more of the indication of a model, and characteristics, of the computing device.

19. The computer-readable medium of claim 18, comprising further instructions, that when executed, causes the server communicating with the agent in the wireless access point to predict a model of the computing device associated with one or more of the indication of a model, or characteristics, of the computing device.

20. The computer-readable medium of claim 18, wherein receiving the indication of a model of the computing device from the wireless access point comprises receiving at least one of an address for the computing device or a name for the computing device.

21. The computer-readable medium of claim 20, wherein predicting the type of the computing device comprises searching a permanent data store accessible to the server for a range of one or more addresses that includes the address for the computing device, wherein the range of one or more addresses is associated with a type of the computing device.

22. The computer-readable medium of claim 21, wherein the address for the computing device is selected from one or more of a group of addresses which includes one or more of: a physical layer address, a data link layer address, a network layer address, a transport layer address, and an application layer address, as defined in an Open Systems Interconnection (OSI)-model for computer networking, or as defined in the Internet protocol suite.

23. The computer-readable medium of claim 20, wherein predicting the type of the computing device comprises searching a permanent data store accessible to the server for a model name that matches the name for the computing device, wherein the model name is associated with a type of the computing device.

24. The computer-readable medium of claim 23, wherein the name for the computing device is selected from one or more of a group of names which includes one or more of: a network-layer name, a session-layer name, an application-layer name, and a login name, as defined in an Open Systems Interconnection (OSI)-model for computer networking, or as defined in the Internet protocol suite.

25. The computer-readable medium of claim 18, wherein receiving one or more characteristics of the computing device from the wireless access point comprises receiving one or more of:
an indication of mobility for the computing device,
a traffic type associated with a predominant data traffic flow between the computing device and the wireless access point via the radio frequency link, an indication of a response by the computing device to a change in transmit power settings on the wireless access point, environmental characteristics for the radio frequency link between the computing device and the wireless access point, data transmission metrics associated with a data traffic flow between the computing device and the wireless access point, whether the computing device is predominantly a source or destination of the data traffic flow between the computing device and the wireless access point, content of data traffic packets from data traffic flow between the computing device and the wireless access point, source and/or destination address of data packets from data traffic packets from data traffic flow between the computing device and the wireless access point, wireless communication capability of the computing device, or hardware and software characteristics of the computing device.

\* \* \* \* \*